United States Patent [19]
Krech, Jr.

[11] Patent Number: 6,003,098
[45] Date of Patent: *Dec. 14, 1999

[54] GRAPHIC ACCELERATOR ARCHITECTURE USING TWO GRAPHICS PROCESSING UNITS FOR PROCESSING ASPECTS OF PRE-RASTERIZED GRAPHICS PRIMITIVES AND A CONTROL CIRCUITRY FOR RELAYING PASS-THROUGH INFORMATION

[75] Inventor: Alan S. Krech, Jr., Fort Collins, Colo.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/641,448

[22] Filed: Apr. 30, 1996

[51] Int. Cl.$^6$ .................................................. G06F 15/80
[52] U.S. Cl. ............................................. 710/51; 345/503
[58] Field of Search ........................... 711/100; 345/501, 345/509, 503, 506; 358/296; 710/51; 712/18; 326/38

[56] References Cited

U.S. PATENT DOCUMENTS

| | | | |
|---|---|---|---|
| 4,720,780 | 1/1988 | Dolecek | 712/18 |
| 4,949,301 | 8/1990 | Joshi et al. | 711/100 |
| 5,027,315 | 6/1991 | Agrawal et al. | 326/38 |
| 5,208,909 | 5/1993 | Corona et al. | 345/433 |
| 5,224,210 | 6/1993 | Pinedo et al. | 345/501 |
| 5,255,359 | 10/1993 | Ebbers et al. | 345/433 |
| 5,289,577 | 2/1994 | Gonzales et al. | 345/506 |
| 5,373,368 | 12/1994 | Taniguro | 358/296 |
| 5,394,524 | 2/1995 | DiNicola et al. | 345/506 |
| 5,420,980 | 5/1995 | Pinedo et al. | 345/501 |
| 5,564,009 | 10/1996 | Pinedo et al. | 345/509 |

*Primary Examiner*—Albert DeCady
*Assistant Examiner*—David Ton
*Attorney, Agent, or Firm*—Kevin M. Hart

[57] ABSTRACT

A graphics processor is disclosed having two processing units and two dual-port RAMs for passing data between the processing units. The hardware is configured to detect whether input data is primitive information or pass-through information. If it is the former, the information is processed as a primitive. If it is the latter, the hardware determines whether one of the dual-port RAMs is available. If so, the available RAM is converted into a pass-through FIFO, and the pass-through information is stored therein. An output process operates continually to send primitive results and pass-through information from the pass-through FIFO out of the graphics processor output as the information becomes available, and ensures that the correct ordering of the information is maintained. If necessary, and if both RAMs are available, both of the dual-port RAMs in the graphics processor may be used as pass-through FIFOs at the same time.

5 Claims, 6 Drawing Sheets

GRAPHIC ACCELERATOR ARCHITECTURE USING TWO GRAPHICS PROCESSING UNITS FOR PROCESSING ASPECTS OF PRE-RASTERIZED GRAPHICS PRIMITIVES AND A CONTROL CIRCUITRY FOR RELAYING PASS-THROUGH INFORMATION

FIELD OF THE INVENTION

This invention relates to computer graphics processing methods and apparatus, and more particularly to methods and apparatus for using a graphics processor as a conduit for pass-through information that is received at the graphics processor input but that is destined for hardware located downstream of the graphics processor in the graphics pipeline.

BACKGROUND

In a typical computer graphics system, an object to be represented on a display screen is broken down into graphics primitives. Graphics primitives are basic geometric elements such as points, lines, vectors, triangles and quadrilaterals. Computer graphics systems use graphics primitives in combination to represent more complex shapes. A typical system for generating and displaying graphics primitives might include a host processor, application and system/driver software running on the host processor, and a specialized subsystem of graphics processing hardware that is controlled by the software running on the host processor.

Many mathematical operations are necessary to process and display graphics primitives. In lower-end computer systems, most of those operations are performed by the host processor. In such lower-end systems, only a simple set of operations need be performed by the graphics subsystem in order to display the graphics information produced by the host processor. In higher-end computer systems, however, better performance is achieved by providing a graphics subsystem that has the capacity to perform many of the mathematical operations that, in lower-end systems, must be performed by the host processor. In such higher-end systems, the host processor may generate graphics information at a fairly abstract level. The host processor then relies on "graphics accelerator" hardware in the graphics subsystem to reduce the abstract information to simpler forms more suitable for downstream operations such as rasterization and storage in a frame buffer memory. In this manner, tasks are off loaded from the host processor, thereby saving host processor bandwidth for higher-level operations.

Graphics primitives vary as to the number and type of computations necessary to process them. For example, primitives may be generated by the host processor for display in a non-positional lighting mode, so that the graphics accelerator need only do cursory lighting operations along with the usual clipping, plane equation and transformation operations necessary for each primitive. On the other hand, primitives may be generated by the host processor for display in a positional lighting mode, so that the graphics accelerator must perform numerous additional and more complex lighting calculations along with the usual clipping, plane equation and transformation operations necessary for each primitive. Consequently, it would be a desirable feature in a graphics processor to have more than one processing unit to increase throughput. It would also be desirable if the processing units were reconfigurable so that their processing power could be utilized effectively for a variety of different types of primitives. Moreover, it has been found to be advantageous to arrange graphics processors in a graphics pipeline, so that the various operations necessary to process graphics primitives may be performed in a more-or-less assembly line fashion by different pieces of specialized hardware.

One of the difficulties in the design of such a graphics subsystem is that not all of the information traveling through the graphics pipeline is destined for, or must be processed by, every piece of hardware in the pipeline. Thus, some mechanism must be provided to allow such "pass-through" information to reach its proper destination in the graphics pipeline efficiently, albeit in the proper order vis-a-vis other information in the pipeline.

It is therefore an object of the present invention to provide a method and apparatus for handling pass-through information effectively in a high-perfornance computer graphics processor.

SUMMARY OF THE INVENTION

The invention includes a method for handling pass-through information in a computer graphics processor of the kind having at least two processing units and a RAM buffer for passing information between the processing units. A determination is made as to whether input data comprises a primitive command or pass-through information. If the input data comprises the former, then a primitive is processed. If the input data comprises the latter, then the RAM buffer is converted into a FIFO, and the pass-through information its stored in the FIFO. The pass-through information is later retrieved from the FIFO and presented at the output of the graphics processor.

The invention also includes a method for processing input data in a computer graphics processor having at least two processing units and at least two RAM buffers for passing information between the processing units. It is determined whether the input data comprises pass-through information or a primitive command. If the input data is a primitive command, a primitive is processed. If the input data is pass-through information, then one or more of the RAM buffers may be used as pass-through FIFOs depending on the need for storage of pass-throughs and the availability of the RAMs.

The invention also includes apparatus in a computer graphics processor for converting one or more RAM buffers, ordinarily used as means for passing data between processing units, into FIFO buffers for temporary storage of pass-through information. The apparatus also includes means for routing the pass-through information from the input of the graphics processor to the output, while maintaining proper ordering of the pass-through information vis-a-vis other information in the graphics pipeline.

BRIEF DESCRIPTION OF THE DRAWINGS

The present invention is described herein with reference to the accompanying drawings, like reference numbers being used therein to indicate identical or functionally similar elements.

DETAILED DESCRIPTION OF THE PREFERRED EMBODIMENTS

Figure 1:
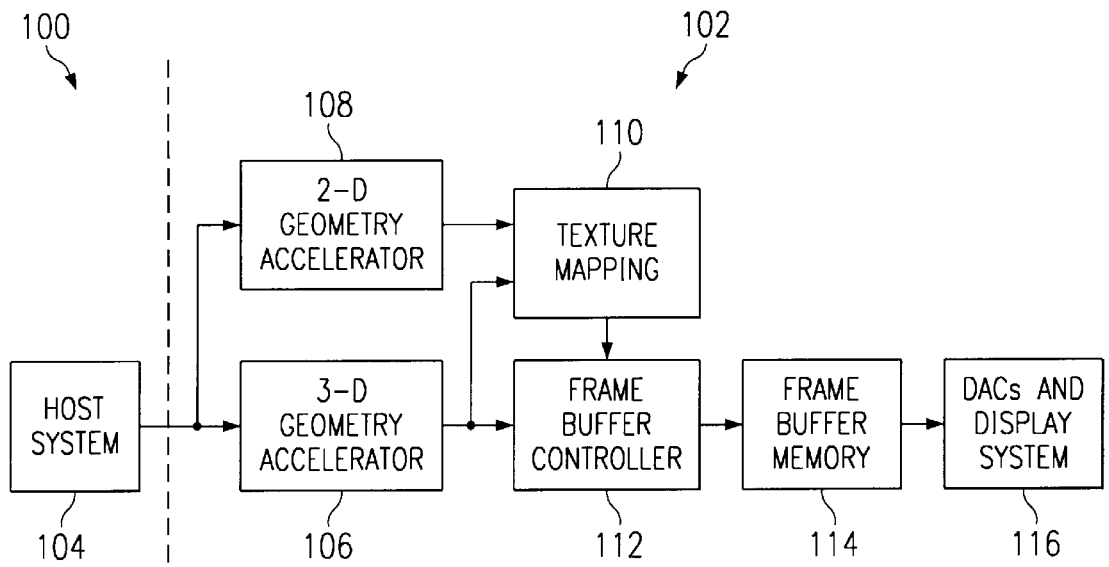
FIG. 1 is a block diagram of a computer system in which the invention may find useful application.

FIG. 1 is a block diagram of a computer system 100 suitable for incorporating the present invention. Computer system 100 includes a high-performance graphics subsystem 102. Host system 104 may be any general-purpose computer system with a host processor, memory, input/output systems and application/system/driver software for controlling graphics subsystem 102. Host system 104 is coupled to 3-D geometry accelerator 106 and 2-D geometry accelerator 108. In other embodiments, host processor 104 may be coupled to fewer than two or more than two such accelerators. For example, a lower performance graphics subsystem might not include a 2-D geometry accelerator 108 or a texture mapping system 110, while a higher performance graphics subsystem might include several 3-D geometry accelerators configured in parallel.

Host system 104 produces primitives to be rendered and passes them to geometry accelerators 106 and 108 in the form of data sets. Such data sets typically include a series of address/data pairs specifying relevant attributes of the primitive to be rendered. For example, one address/data pair may specify the X coordinate of one vertex of a triangle primitive. The next two pairs may specify the Y and Z coordinates for the same vertex of the same triangle primitive. Other pairs may specify information such as the "alpha" or transparency value for the vertex, the R, G and B color intensity values for the vertex, the X, Y and Z components of the normal value for the vertex, and the S and T coordinates for texture mapping of the vertex. Once all of the information for all of the vertices of the triangle primitive has been loaded into a given geometry accelerator, host system 104 typically issues a command to the accelerator requesting it to begin processing the just-loaded primitive.

Processing of primitives by geometry accelerators 106 and 108 may involve operations such as transformations (scaling, rotation and translation operations), calculation of slopes for the various attributes of the primitive along the primitive's edges, lighting calculations, clipping calculations and plane equation calculations.

Once such calculations have been completed, geometry accelerators 106 and 108 may load their sets of results into downstream hardware such as texture mapping system 110 and frame buffer controller 112, and then issue a command ordering the downstream hardware to continue processing the new information. Typically, texture mapping system 110 outputs texture data to be combined by frame buffer controller 112 with primitive data exiting 3-D geometry accelerator 106. In addition to combining such information, frame buffer controller 112 also performs a rasterization function by calculating appropriate values for each pixel that will represent the primitive. These values are calculated based on the transformed vertex, slope and other information produced by 3-D geometry accelerator 106. Frame buffer controller 112 writes the resulting pixel values into frame buffer memory 114. The values in frame buffer memory 114 are read continuously by display system 116. Display system 116 typically converts the read pixel values into analog form using digital to analog converters ("DACs") and displays them on a monitor device such as a CRT.

While the present invention may find application in a variety of graphics processing devices, it is believed that the invention will best be implemented in a graphics accelerator such as 3-D geometry accelerator 106.

Figure 2:
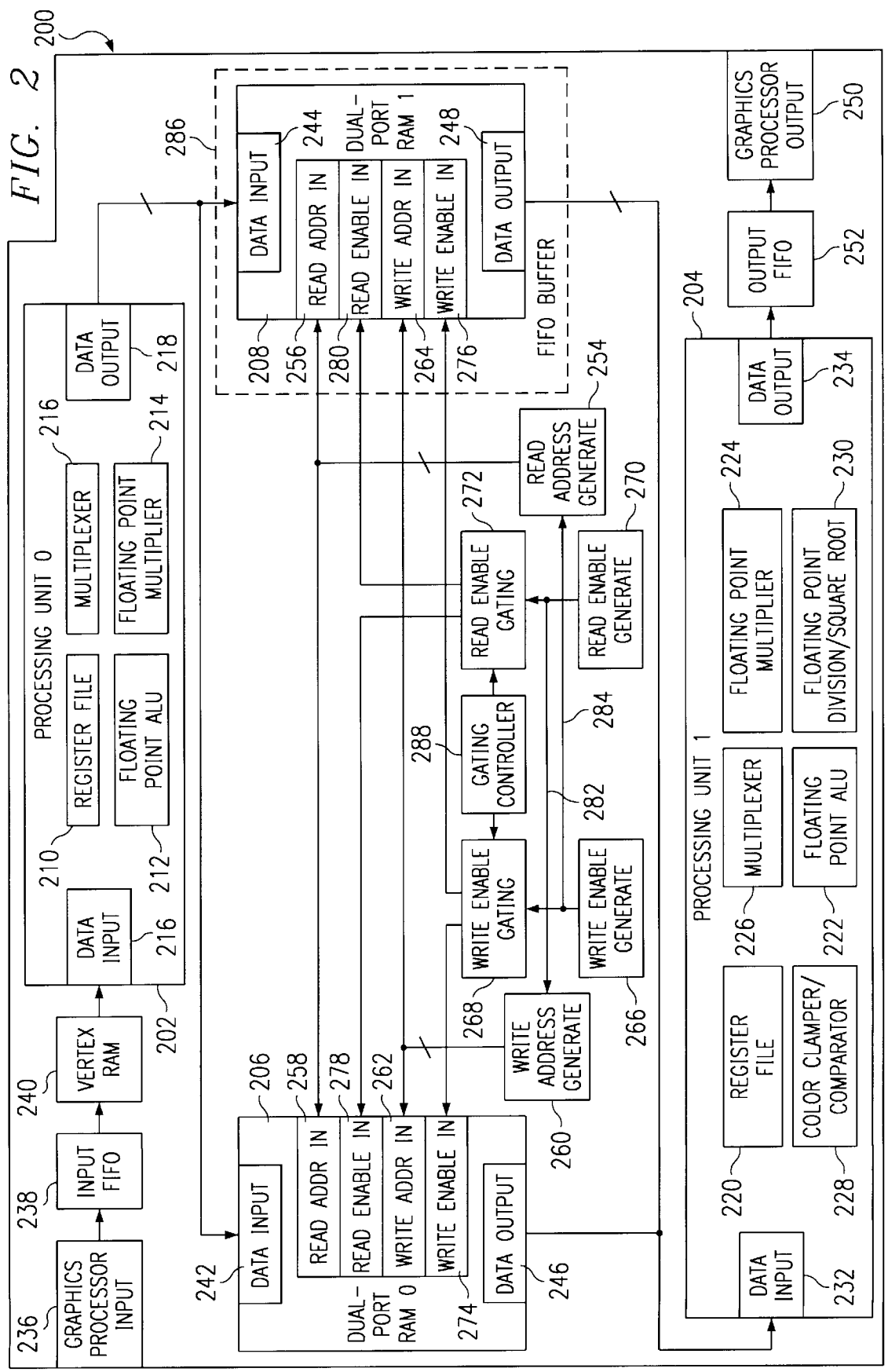
FIG. 2 is a block diagram of a graphics processor in which the invention may find useful application.

FIG. 2 is a block diagram illustrating a graphics processor, such as 3-D geometry accelerator 106, that would be suitable for incorporating the invention. Graphics processor 200 includes a first processing unit 202, a second processing unit 204, a first dual-port RAM 206 and a second dual-port RAM 208. Although processing unit 202 and processing unit 204 may be implemented so that they both have the same components and thus the same capabilities, in a reduced-cost preferred embodiment, one of the processing units is configured to have fewer components and capabilities than the other. This type of unequal and cost-saving arrangement is made feasible because the hardware of graphics processor 200 may be reconfigured, when necessary, to make the capabilities of each processing unit more accessible. In the embodiment shown, processing unit 202 contains a register file 210, a floating point arithmetic and logic unit ("ALU") 212, a floating point multiplier 214, and multiplexer circuitry 216 for providing appropriate switching and data paths within processing unit 202. Processing unit 202 is also equipped with a data input 216 and a data output 218. Processing unit 204, on the other hand, contains more components. In addition to a register file 220, a floating point ALU 222, a floating point multiplier 224 and a multiplexer circuitry 226, processing unit 204 also contains a color clamper/comparator 228 and a floating point division/square root unit 230. Processing unit 204 is also equipped with a data input 232 and a data output 234. Graphics processor input 236 is coupled to input FIFO 238. The output of input FIFO 238 is coupled to data input 216 via vertex RAM 240. Thus, in this embodiment, graphics processor input 236, input FIFO 238 and vertex RAM 240 form an input data path. Vertex RAM 240 acts as a repository for an input data set (corresponding to a primitive) before a command is received by graphics processor 200 to draw the primitive. In a preferred embodiment, vertex RAM 240 may be double buffered so that it may begin accumulating information corresponding to a new primitive after the command is received to draw the primitive already stored in vertex RAM 240.

Data output 218 is coupled to dual-port RAMs 206 and 208 at data inputs 242 and 244, respectively. Data outputs 246 and 248 of dual-port RAMs 206 and 208, respectively, are coupled to data input 232 of processing unit 204. Data output 234 of processing unit 204 is coupled to graphics processor output 250 via output FIFO 252, forming an output data path.

A read address generator 254 is provided, with its output coupled to read address input 256 of dual-pert RAM 208, as well as to read address input 258 of dual-port RAM 206. Similarly, a write address generator 260 is provided, with its output coupled to write address input 262 of dual-port RAM 206, as well as to write address input 264 of dual-port RAM 208. A write enable generator 266 is provided, with its output coupled to a write enable gating device 268. A read enable generator 270 is provided, with its output coupled to a read enable gating device 272. Write enable gating device 268 has two outputs, one driving write enable input 274 of dual-port RAM 206, and the other driving write enable input 276 of dual-port RAM 208. Read enable gating device 272 has two outputs, one driving read enable input 278 of dual-port RAM 206, and the other driving read enable input 280 of dual-port RAM 208. Read enable gating device 272 and write enable gating device 268 are controlled by gating controller 288. In this manner, the write enable signal may be routed either to dual-port RAM 206 or to dual-port RAM 208. Likewise, the read enable signal may be routed either to dual-port RAM 206 or to dual-port RAM 208.

As is indicated by a dashed line in the drawing, dual-port RAM 208 may function as either a RAM or a FIFO buffer 286, depending on the operation of the read and write address generators, the gating devices and the gating controller. A wire 282 is provided between. the read enable signal and write address generator 260, and a wire 284 is provided between the write enable signal and read address generator 254. These wires provide a means for the respective address generators to sense when reads and writes are occurring with respect to dual-port RAM 208 in order to keep track of FIFO contents when dual-port RAM 208 is being used as FIFO buffer 286.

The operation of graphics processor 200 may best be appreciated with reference to Tables 1, 2 and 3 below.

positional lighting means that the same lighting information is generally applicable to all primitives in a modeling scene. Positional lighting, on the other hand, means that the modeling scene itself contains light sources. When positional lighting is present, the distance must be calculated between each vertex of a primitive and each light source in the modeling scene. This is preferably done by calculating the square roots of the sum-of-squares values between the vertices and the lights sources. For non-positionally lighted primitives, these calculations are not necessary.

Referring now to Table 1, we will walk through an example in which four graphics primitives, called primitives 1, 2, 3 and 4, are processed in non-positional lighting mode. In row 1, processing unit 0 begins processing primitive 1 by generating a set of intermediate results for primitive 1. These results are written into RAM 0 by means of write address generator 260, write enable generator 266, write enable gating device 268 and gating controller 288. When processing unit 0 has finished generating the intermediate results for

TABLE 1

Non-Positional Lights Mode

| | Processing Unit 0 | | | | | | |
|---|---|---|---|---|---|---|---|
| | Source of | Description | Description of | Destination | RAM 0 | | RAM 1 | |
| Row | Inputs | of Inputs | Operations | of Outputs | Contents | Status | Contents | Status |
| 1 | input data path | data set for prim. 1 | generate intermed. results for prim. 1 | RAM 0 | | filling with data from PU 0 | | |
| 2 | input data path | data set for prim. 2 | generate intermed. results for prim. 2 | RAM 1 | intermed. results for prim. 1 | being read by PU 1 | | filling with data from PU 0 |
| 3 | input data path | data set for prim. 3 | generate intermed. results for prim. 3 | RAM 0 | | filling with data from PU 0 | intermed. results for prim. 2 | being read by PU 1 |
| 4 | input data path | data set for prim. 4 | generate intermed. results for prim. 4 | RAM 1 | intermed. results for prim. 3 | being read by PU 1 | | filling with data from PU 0 |
| 5 | | | | | | | intermed. results for prim. 4 | being read by PU 1 |

| | | Processing Unit 1 | | |
|---|---|---|---|---|
| Row | Source of Inputs | Description of Inputs | Description of Operations | Destination of Outputs |
| 1 | | | | |
| 2 | RAM 0 | intermed. results for prim. 1 | generate final results for prim. 1 | output data path |
| 3 | RAM 1 | intermed. results for prim. 2 | generate final results for prim. 2 | output data path |
| 4 | RAM 0 | intermed. results for prim. 3 | generate final results for prim. 3 | output data path |
| 5 | RAM 1 | intermed. results for prim. 4 | generate final results for prim. 4 | output data path |

Table 1 illustrates a preferred flow of operations for graphics processor 200 when it is processing primitives for which lighting is not positional in nature, while Tables 2 and 3 illustrate two different preferred flows of operation for processing primitives for which lighting is positional. Nonprimitive 1, we move to row 2. In row 2, both of the processing units are active:

Processing unit 1 is reading the intermediate results for primitive 1 out of RAM 0 by means of read address generator 254, read enable generator 270, read enable gating device 272 and gating controller 288. It uses these intermediate results to calculate final results for primitive 1, which it sends to the output data path. Simultaneously, processing unit 0 begins generating a set of intermediate results for primitive 2. It stores these intermediate results in RAM 1 by means of write address generator 260, write enable generator 266, write enable gating device 268 and gating controller 288. After these operations are complete, we proceed to row 3:

In row 3, processing unit 1 begins generating the final results for primitive 2 by reading primitive 2's intermediate results from RAM 1. Simultaneously, processing unit 0 begins generating intermediate results for primitive 3, which it stores in RAM 0.

In row 4, processing unit 1 generates final results for primitive 3 by reading primitive 3's intermediate results from RAM 0. Meanwhile, processing unit 0 generates intermediate results for primitive 4 and stores them in RAM 1. Finally, in row 5, processing unit 1 generates final results for primitive 4 by reading primitive 4's intermediate results from RAM 1.

In a preferred embodiment, the intermediate results for each primitive calculated by processing unit 0 in non-positional lighting mode would be results from transformations and partial slope calculations. The final results calculated by processing unit 1 for each primitive would be results from clipping, plane equations and lighting calculations. This division of labor between processing units in this embodiment and those that follow may be varied in other embodiments.

TABLE 2

Positional Lights Mode

Processing Unit 0

| Row | Source of Inputs | Description of Inputs | Description of Operations | Destination of Outputs | RAM 0 Contents | RAM 0 Status | RAM 1 Contents | RAM 1 Status |
|---|---|---|---|---|---|---|---|---|
| 1 | input data path | data set for prim. 1 | generate first intermed. results for prim. 1 | RAM 0 | | filling with data from PU 0 | | |
| 2 | input data path | data set for prim. 1 | generate second intermed. results for prim. 1 | RAM 1 | first intermed. results for prim. 1 | being read by PU 1 | | filling with data from PU 0 |
| 3 | | | | | | | second intermed. results for prim. 1 | being read by PU 1 |
| 4 | input data path | data set for prim. 2 | generate first intermed. results for prim. 2 | RAM 0 | | filling with data from PU 0 | | |
| 5 | input data path | data set for prim. 2 | generate second intermed. results for prim. 2 | RAM 1 | first intermed. results for prim. 2 | being read by PU 1 | | filling with data from PU 0 |
| 6 | | | | | | | second intermed. results for prim. 2 | being read by PU 1 |

Processing Unit 1

| Row | Source of Inputs | Description of Inputs | Description of Operations | Destination of Outputs |
|---|---|---|---|---|
| 1 | | | | |
| 2 | RAM 0 | first intermed. results for prim. 1 | generate first part of final results for prim. 1 | output data path |
| 3 | RAM 1 | second intermed. results for prim. 1 | generate second part of final results for prim. 1 | output data path |
| 4 | | | | |
| 5 | RAM 0 | first intermed. | generate first part of | output data path |

TABLE 2-continued

Positional Lights Mode

| Row | | | | |
|---|---|---|---|---|
| 6 | RAM 1 | results for prim. 2 second intermed. results for prim. 2 | final results for prim. 2 generate second part of final results for prim. 2 | output data path |

Referring now to Table 2, we will walk through an example in which two graphics primitives, called primitives 1 and 2, are processed in positional lighting mode. (Recall that, in positional lighting mode, additional calculations are required for each primitive.) In row 1, processing unit 0 begins processing primitive 1 by generating a first set of intermediate results and storing them in RAM 0. In a preferred embodiment, this first set of intermediate results would be results from transformations and partial slope calculations. In row 2, processing unit 1 generates a first part of the final results for primitive 1 (completed transformations and slopes) by reading the first set of intermediate results from RAM 0. Meanwhile, processing unit 0 begins performing positional lighting calculations for primitive 1 (sum-of-squares calculations) and storing these as a second set of intermediate results in RAM 1. In row 3, processing unit 1 reads this second set of intermediate results from RAM 1 and generates the second part of the final results for primitive 1. (The second part of the final results for primitive 1 might include, for example, the ambient, diffuse and specular color contributions for each light source and each vertex of primitive 1. As those having ordinary skill in the art of graphics processing will readily understand, these values may be calculated based in part on the attenuation factor and spot light effect for each light and each vertex, which in turn may be calculated after the distance of each light from each vertex is known. Distances would be calculated by determining the square roots of the sum-of-squares results generated by processing unit 0.) In rows 4, 5 and 6, the process is repeated for primitive 2.

TABLE 3

Positional Lights Mode
(Alternative method in which RAM 1 acst as a FIFO)

| | Processing Unit 0 | | | | | | |
|---|---|---|---|---|---|---|---|
| | | | Description | | RAM 0 | | RAM 1 |
| | Source of | Description | of | Destination | | | |
| Row | Inputs | of Inputs | Operations | of Outputs | Contents | Status | Contents | Status |
| 1 | input data path | data set for prim. 1 | generate first intermed. results for prim. 1 | RAM 0 | | filling with data from PU 0 | | |
| 2 | input data path | data set for prim. 1 | generate second intermed. results for prim. 1 | RAM 1 | first intermed. results for prim. 1 | being read by PU 1 | | filling with data from PU 0 in FIFO fashion |
| 3 | input data path | data set for prim. 1 | continued | continued | | | accumulation of second intermed. results for prim. 1 not yet read by PU 1 | simultaneously filling with data from PU 0 and being read by PU 1 in FIFO fashion |
| 4 | | | | | | | remaining portion of second intermed. results for prim. 1 not yet read by PU 1 | being read by PU 1 in FIFO fashion |

| | Processing Unit 1 | | | |
|---|---|---|---|---|
| | | | Description | |
| | Source of | Description | of | Destination |
| Row | Inputs | of Inputs | Operations | of Outputs |

TABLE 3-continued

Positional Lights Mode
(Alternative method in which RAM 1 acst as a FIFO)

| 1 2 | RAM 0 | first intermed. results for prim. 1 | generate first part of final results for prim. 1 | output data path |
|---|---|---|---|---|
| 3 | RAM 1 | second intermed. results for prim. 1 | generate second part of final results for prim. 1 | output data path |
| 4 | RAM 1 | second intermed. results for prim. 1 | continued | continued |

Table 3 illustrates an alternative preferred method for processing primitives in positional lighting mode. In this alternative method, one of the dual-port RAMs of graphics processor 200 (RAM 1 in this embodiment) is used as a FIFO buffer. This is accomplished by having write address generator 260 and read address generator 254 provide the read and write pointers necessary to implement the FIFO, and by using wires 282 and 284 to keep track of FIFO reads and writes, respectively. In row 1, processing unit 0 begins processing primitive 1 by generating a first set of intermediate results and storing them in RAM 0. (Again, in a preferred embodiment, this first set of intermediate results would be results from transformations and partial slope calculations.) In row 2, processing unit 1 generates a first part of the final results for primitive 1 (completed transformations and slopes) by reading the first set of intermediate results from RAM 0. Meanwhile, processing unit 0 begins performing positional lighting calculations for primitive 1 (sum-of-squares calculations) and storing these as a second set of intermediate results by writing them into the FIFO buffer that has been created using RAM 1 as described above. In row 3, processing unit 0 continues calculating sum-of-squares lighting information and sending it to the FIFO buffer, while processing unit 1 begins reading the FIFO buffer and completing the lighting calculations (by determining the square roots of the sum-of-squares results and using the distance values to calculate color contributions for the vertices), thus generating the second part of the final results for the primitive and sending them to the output path. In row 4, processing unit 0 has completed its job, and processing unit 1 finishes reading the FIFO buffer and completes sending the final results for the primitive to the output path. In one preferred embodiment, processing unit 0 may be configured to begin processing another primitive in row 4. In another preferred embodiment, processing unit 0 may be configured to wait until processing unit 1 has finished processing primitive 1 before processing unit 0 starts the next primitive.

One advantage of using the alternative method illustrated in Table 3 is that the dual-port RAMs may be made smaller than would be the case in Table 2. This is because, while many results are calculated per primitive in the context of determining sum-of-squares distances of vertices from light sources, only a subset of those results must be stored at any given time when the RAM is used as a FIFO and both processing units are working on the distance calculations at the same time.

Figure 3:
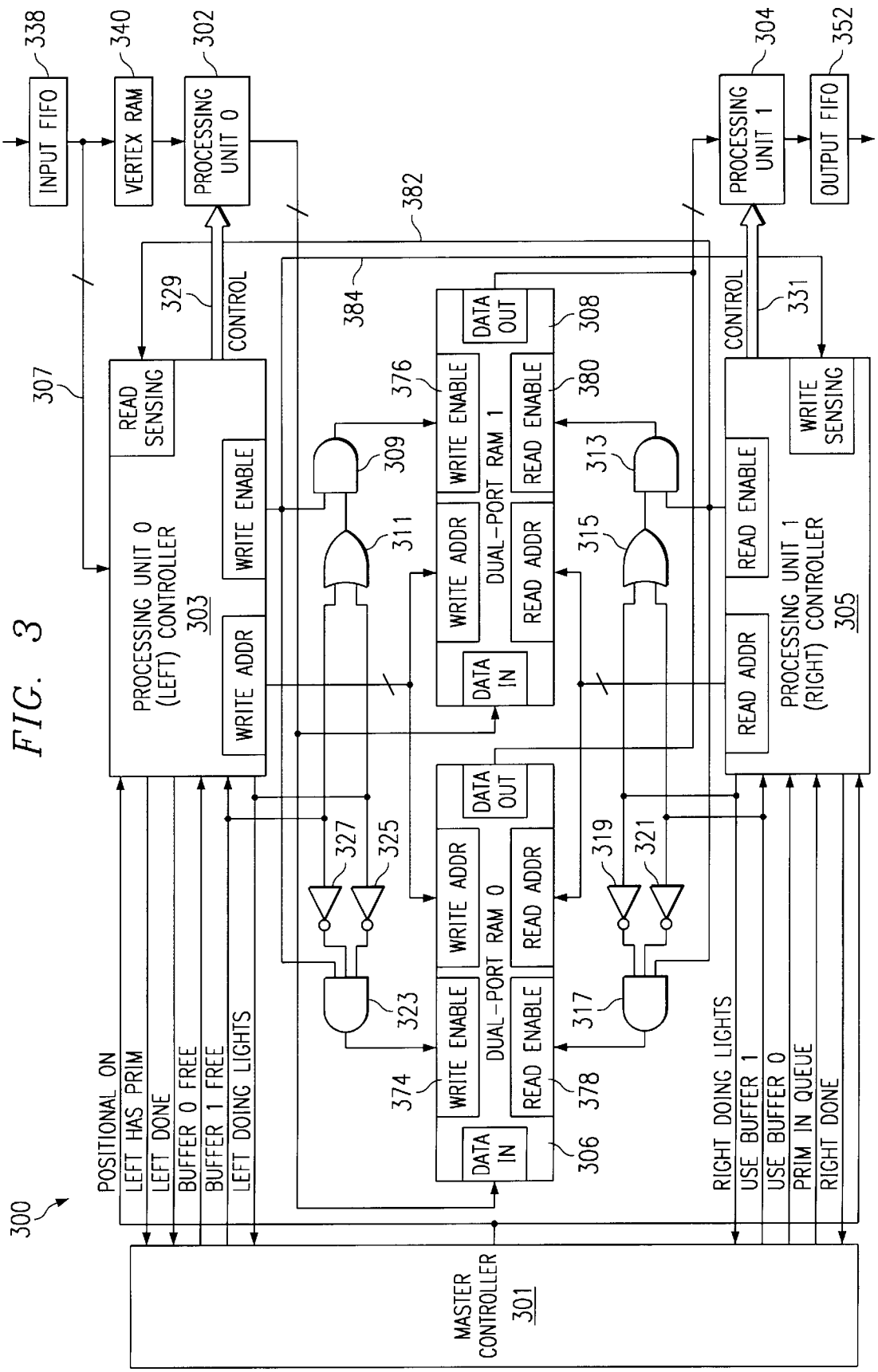
FIG. 3 is a block diagram showing, in more detail, a graphics processor in which the invention may find useful application.

FIG. 3 is a block diagram illustrating a graphics processor 300, also suitable for incorporating the invention. While graphics processor 300 is functionally equivalent to graphics processor 200, it is believed that graphics processor 300 may represent a more practical implementation than graphics processor 200. In graphics processor 300, the functions of write address generator 260, read address generator 254, write enable generator 266, read enable generator 270, write enable gating device 268, read enable gating device 272, gating controller 288 and sensing means 282 and 284 are subsumed within master controller 301, left controller 303, right controller 305 and all of the combinational logic and wiring shown between left controller 303 and right controller 305. Signal descriptions will now be given for a better understanding of graphics processor 300.

Positional On: Graphics processor 300 is assumed to contain a mode register (not shown) which is written by a host processor such as that in host system 104. The mode register would contain, for example, one bit for each light source active in a modeling scene involving positional lighting. The Positional On signal may be derived by logically OR-ing each of those bits in the mode register. If Positional On is not asserted, then graphics processor 300 will process all primitives in non-positional lighting mode, as in the illustration of Table 1. On the other hand, when the mode register is written to indicate positional lighting, the Positional On signal is asserted, causing all primitives to be processed in positional lighting mode, as in the illustration of Table 3. (The assertion of Positional On activates mechanisms within left controller 303 and right controller 305 that cause RAM 308 to behave as a FIFO buffer.)

Left Has Prim: While vertex information for a given primitive is loaded into vertex RAM 340, left controller 303 monitors the address lines of the input data path using bus 307. In this manner, left controller 303 can detect when the command is received by graphics processor 300 ordering it to begin drawing the primitive, at which time left controller 303 asserts the Left Has Prim signal.

Buffer 0 Free/Buffer 1 Free: Once master controller 301 has detected the assertion of Left Has Prim, it determines whether either RAM 0 or RAM 1 is available (not being used by processing unit 0, not holding data for processing unit 1, and not being used by processing unit 1). When master controller 301 finds an available RAM, it asserts the corresponding Buffer Free signal. Left controller 303 uses this assertion as a start timing, signal to begin processing the primitive. The combinational logic (to be described below) uses this assertion to gate the write enable signal to the corresponding RAM, so that the results from processing unit 0 will be written to the RAM indicated by the Buffer Free signal. The Buffer Free signal remains asserted until Left Done is asserted.

Left Done: Left controller 303 asserts this signal when processing unit 0 has completed its calculations for whichever primitive it is processing.

Left Doing Lights: When graphics processor 300 is in positional lighting mode (Positional On is asserted), left controller 303 asserts Left Doing Lights when processing unit 0 finishes generating its first set of intermediate results and begins generating its second set of intermediate results. In positional lighting mode, Left Done is not asserted until after processing unit 0 has finished generating both sets of intermediate results for the primitive.

Prim In Queue: When processing unit 0 has finished generating a set of intermediate results and left controller 303 so indicates by asserting either Left Done (in non-positional lighting mode) or Left Doing Lights (in positional lighting mode), master controller 301 signals processing unit 1 to begin by asserting Prim In Queue. (See also, Use Buffer 0/Use Buffer 1.)

Use Buffer 0/Use Buffer 1: These signals indicate in which RAM (RAM 0 or RAM 1) processing unit 1 should look to find the intermediate results to begin working on. The combinational logic (to be described below) uses this assertion to gate the read enable signal to the corresponding RAM, so that the results from processing unit 0 will be read from the RAM indicated by the Use Buffer signal. The Use Buffer signal remains asserted until Right Done is asserted.

Right Done: Right controller 305 asserts this signal when processing unit 1 has finished generating final results for whichever primitive it is processing. In a preferred embodiment, neither of the Buffer Free signals will be asserted in positional lighting mode until both Left Done and Right Done are asserted.

Right Doing Lights: Right controller 305 asserts this signal in positional lighting mode to indicate that processing unit 1 has finished generating the first part of the final results for the positionally-lighted primitive, and is now beginning to generate the second part of the final results for this primitive. (In a preferred embodiment, the second part of the final results would be the square roots of the sum-of-squares information already calculated by processing unit 0.)

Write sensing line 384 and read sensing line 382 are used in positional lighting mode as part of the mechanism for causing dual-port RAM 308 to function as a FIFO buffer.

The write enable input 374 for RAM 0 is driven by the output of AND gate 323, whose inputs are the inverse of Left Doing Lights (see inverter 325), the inverse of Buffer 1 Free (see inverter 327) and the write enable signal. The read enable input 378 for RAM 0 is driven by the output of AND gate 317, whose inputs are the inverse of Right Doing Lights (see inverter 319), the inverse of Use Buffer 1 (see inverter 321) and the read enable signal.

The write enable input 376 of RAM 1 is driven by the output of AND gate 309, whose inputs are the write enable signal and the output of OR gate 311. The inputs of OR gate 311 are Buffer 1 Free and Left Doing Lights. The read enable input 380 of RAM 1 is driven by the output of AND gate 313, whose inputs are the read enable signal and the output of OR gate 315. The inputs of OR gate 315 are Use Buffer 1 and Right Doing Lights.

The gating of the write enable signal is achieved as follows: When graphics processor 300 is in non-positional lighting mode and a primitive is presented to be processed (Left Has Prim is asserted), assume that master controller 301 determines RAM 0 is idle. It will then assert Buffer 0 Free, and Buffer 1 Free will remain unasserted. Because graphics processor 300 is in non-positional lights mode, Left Doing Lights will never be asserted. Thus, the outputs of both inverters 325 and 327 will be asserted, gating the write enable signal to write enable input 374. Because neither Left Doing Lights nor Buffer 1 Free is asserted, the output of OR gate 311 will be unasserted, thus inhibiting the write enable signal from reaching write enable input 376. On the other hand, if either Buffer 1 Free is asserted or Left Doing Lights is asserted (which will occur when graphics processor 300 is in positional lights mode), then the write enable signal will be inhibited from reaching write enable input 374 and will instead be gated to write enable input 376.

The gating of the read enable signal is achieved as follows: When graphics processor 300 is in non-positional lighting mode and a primitive is being processed, assume processing unit 0 has finished generating its intermediate results and has placed those results in RAM 0. Assume left controller 303 has asserted Left Done. Master controller 301 will then assert Use Buffer 0 (and Prim In Queue), and Use Buffer 1 will remain unasserted. Because graphics processor 300 is in non-positional lights mode, Right Doing Lights will never be asserted. Thus, the outputs of both inverters 319 and 321 will be asserted, gating the read enable signal to read enable input 378. Because neither Right Doing Lights nor Use Buffer 1 is asserted, the output of OR gate 315 will be unasserted, thus inhibiting the read enable signal from reaching read enable input 380. Or the other hand, if either Use Buffer 1 is asserted or Right Doing Lights is asserted (which will occur when graphics processor 300 is in positional lights mode), then the lead enable signal will be inhibited from reaching read enable input 378 and will instead be gated to read enable input 380.

Note that, in an alternative embodiment, processing unit 0 may be configured to be able not only to write to RAM 0 and RAM 1, but also to read therefrom. Such a configuration may facilitate processing of primitives by processing unit 0.

The preferred hardware and method for handling pass-through information according to the invention will now be discussed with reference to FIGS. 4–6 and Tables 4 and 5.

Figure 4A:
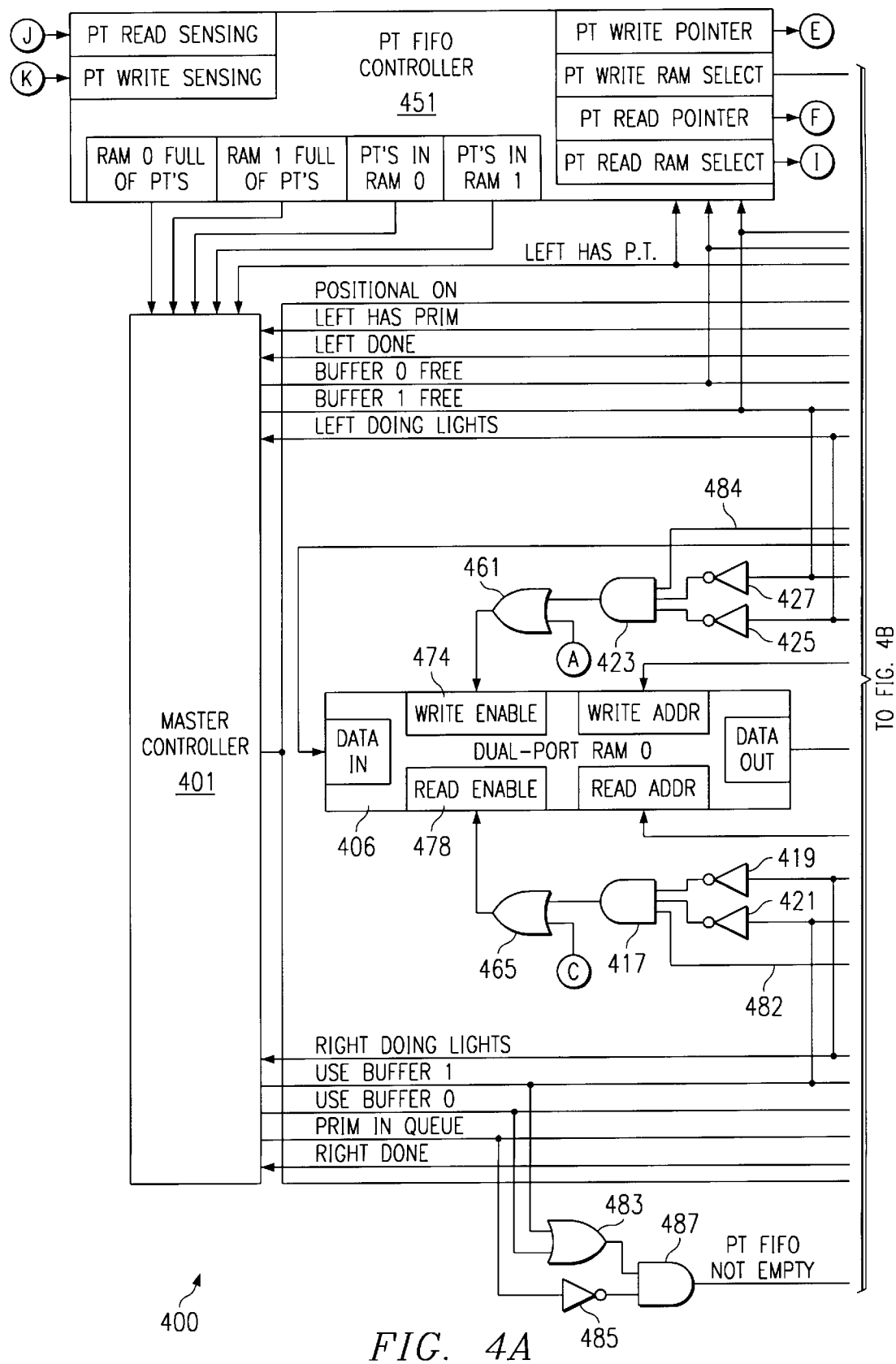
FIGS. 4A–4B are a block diagram of a graphics processor configured according to a preferred embodiment of the invention.
Figure 4B:
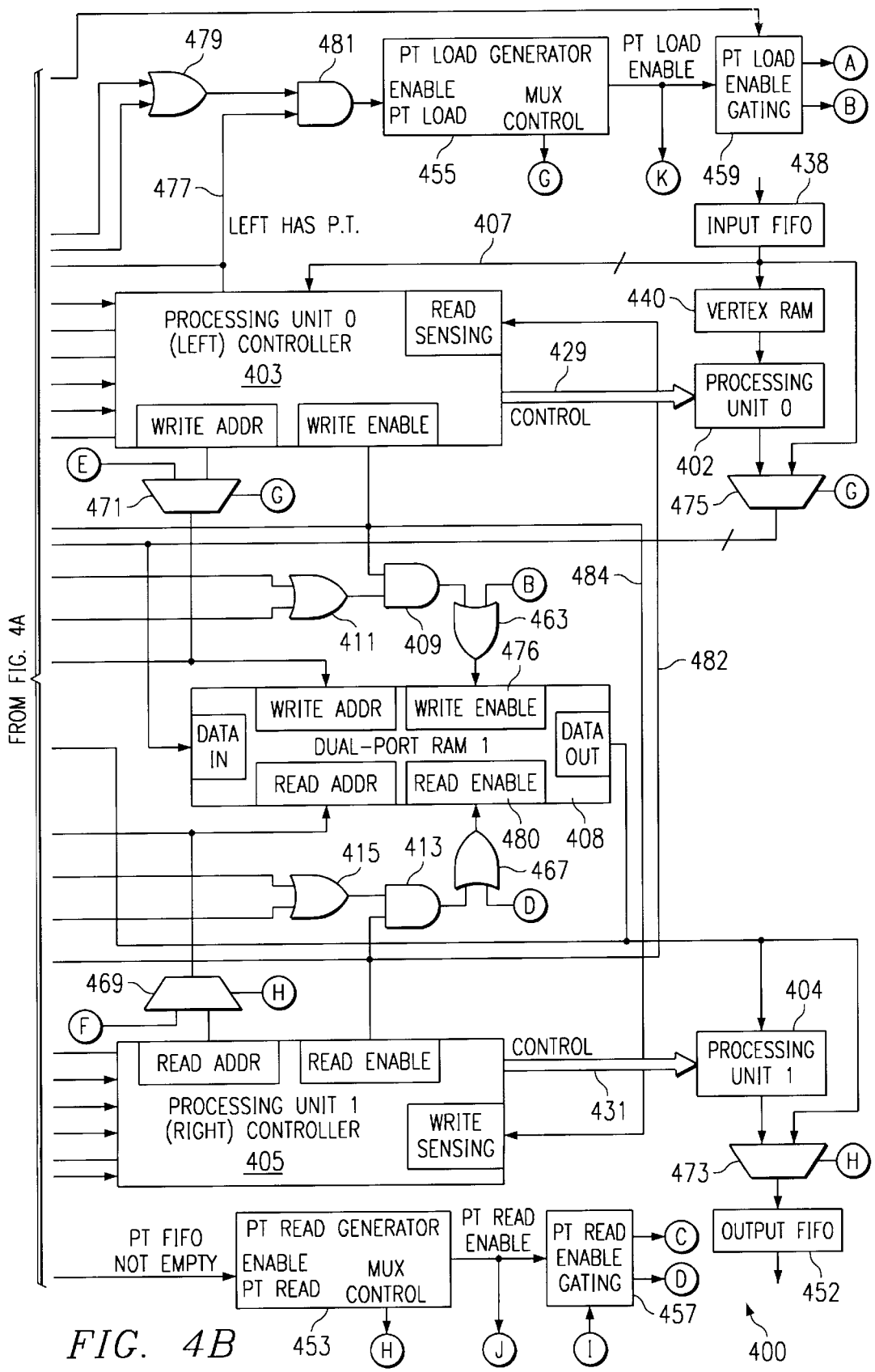

FIGS. 4A–4B illustrate a graphics processor 400 configured according to a preferred embodiment of the invention. It is identical to graphics processor 300 except for the addition of several new components and signals. Thus, only the added signals and components will be discussed hereinafter.

A new signal Left Has PT 477 is provided. Left Controller 403 asserts this signal when it decodes, using bus 407, that the data coming out of input FIFO 438 is pass-through information (typically an address/data pair destined for hardware downstream of graphics processor 400 and not to be processed by processor 400). Pass-through information is referred to hereinafter as a "PT." PT FIFO Controller 451 is provided having PT Read Sensing and PT Write Sensing inputs for updating PT Read Pointer and PT Write Pointer. PT Write RAM Select and PT Read RAM Select may be thought of as part of the address indicated by PT Write Pointer and PT Read Pointer, respectively. The purpose of PT FIFO Controller 451 is to cause either RAM 406 or RAM 408, or both, to function as FIFOs for PTs. Thus, several other outputs are also provided by PT FIFO Controller 451: RAM 0 Full of PTs, RAM 1 Full of PTs, PTs in RAM 0 and PTs in RAM 1 (all self explanatory). Master Controller 401 uses these signals in determining the proper status of Buffer 0 Free, Buffer 1 Free, Use Buffer 0 and Use Buffer 1. PT FIFO Controller 451 also uses Buffer 0 Free and Buffer 1 Free as inputs in determining whether RAMs 406 and 408 are available to be used as PT FIFO buffers.

The PT Read Sensing input is coupled to the PT Read Enable signal. The PT Write Sensing input is coupled to the PT Write enable signal. The PT Write Pointer is coupled to one of the data inputs of multiplexer 471, while the other data input of multiplexer 471 is coupled to the write address generated by left controller 403. The select input of multiplexer 471 is coupled to the mux control output of PT Load Generator 455. The data output of multiplexer 471 is coupled to the write address inputs of both RAM 0 and RAM 1. The PT Write RAM Select output is coupled to PT Load Enable Gating device 459 to determine whether PT writes will go into RAM 0 or RAM 1. Similarly, the PT Read RAM Select output is coupled to PT Read Enable Gating device 457 to determine whether PT reads will come from RAM 0 or RAM 1.

The PT Read Pointer is coupled to one of the data inputs of multiplexer 469, while the other data input of multiplexer 469 is coupled to the read address output of right controller 405. The select input of multiplexer 469 is coupled to the mux control output of PT Read Generator 453. The data output of multiplexer 469 is coupled to the read address inputs of both RAM 0 and RAM 1.

The write enable input 474 of RAM 0 is driven by the output of OR gate 461, whose inputs are: output A from PT Load Enable Gating device 459; and the output of AND gate 423. The write enable input 476 of RAM 1 is driven by the output of OR gate 476, whose inputs are: output B from PT Load Enable Gating device 459; and the output of AND gate 409. The read enable input 478 of RAM 0 is driven by the output of OR gate 465, whose inputs are: output C from PT Read Enable Gating device 457; and the output of AND gate 417. The read enable input 480 of RAM 1 is driven by the output of OR gate 467, whose inputs are: output D from PT Read Enable Gating device 457; and the output of AND gate 413.

Multiplexer 475 is provided, having one of its data inputs coupled to the output of processing unit 0; its other data input is coupled to the output of input FIFO 438. Its data output is coupled to the data inputs of both RAM 0 and RAM 1. Its select input is coupled to the mux control output of PT Load Generator 455.

Multiplexer 473 is also provided, having one of its data inputs coupled to the output of processing unit 1; its other data input is coupled to the data outputs of both RAM 0 and RAM 1. Its data output is coupled to the input of output FIFO 452. Its select input is coupled to the mux control output of PT Read Generator 453.

By virtue of the operation of OR gate 479 and AND gate 481, PT Load Generator 455 is enabled whenever either Buffer 0 Free or Buffer 1 Free is asserted and Left Has PT is also asserted (indicating that not only does a PT need to be written into a PT FIFO, but also a RAM is available for the write). By virtue of the operation of OR gate 483, inverter 485 and AND gate 487, PT Read Generator 453 is enabled whenever either Use Buffer 0 or Use Buffer 1 is asserted and Prim In Queue is not asserted (indicating that data in one of the RAMs is available for processing, but the data is not primitive information intended for processing by processing unit 1). It should be noted that, in a preferred embodiment, Prim In Queue will not be asserted by master controller 401 even if intermediate results are available in one of the RAMs for processing unit 1 to process, if all preceding PTs in the other RAM have not yet been sent to output FIFO 452. This is to ensure that PTs and primitive information will retain their proper sequence in the graphics pipeline.

Figure 6:
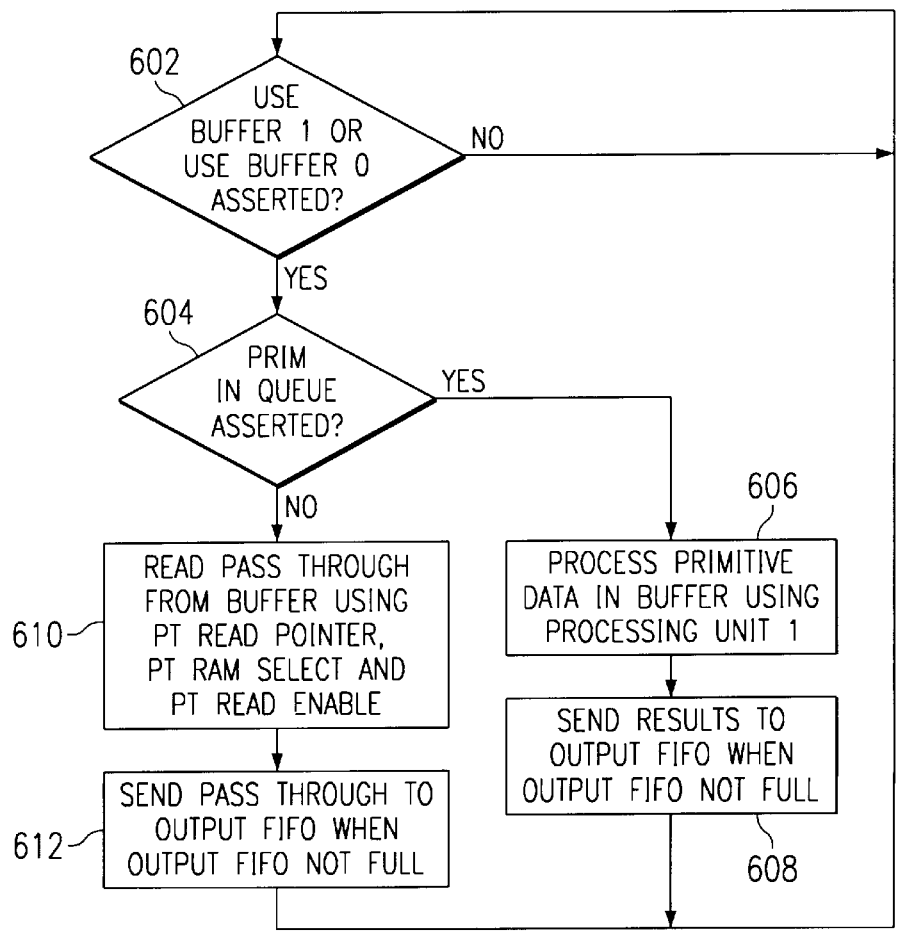
FIG. 6 is a flow diagram illustrating a preferred method of handling output data in a graphics processor according to the invention.
Figure 5:
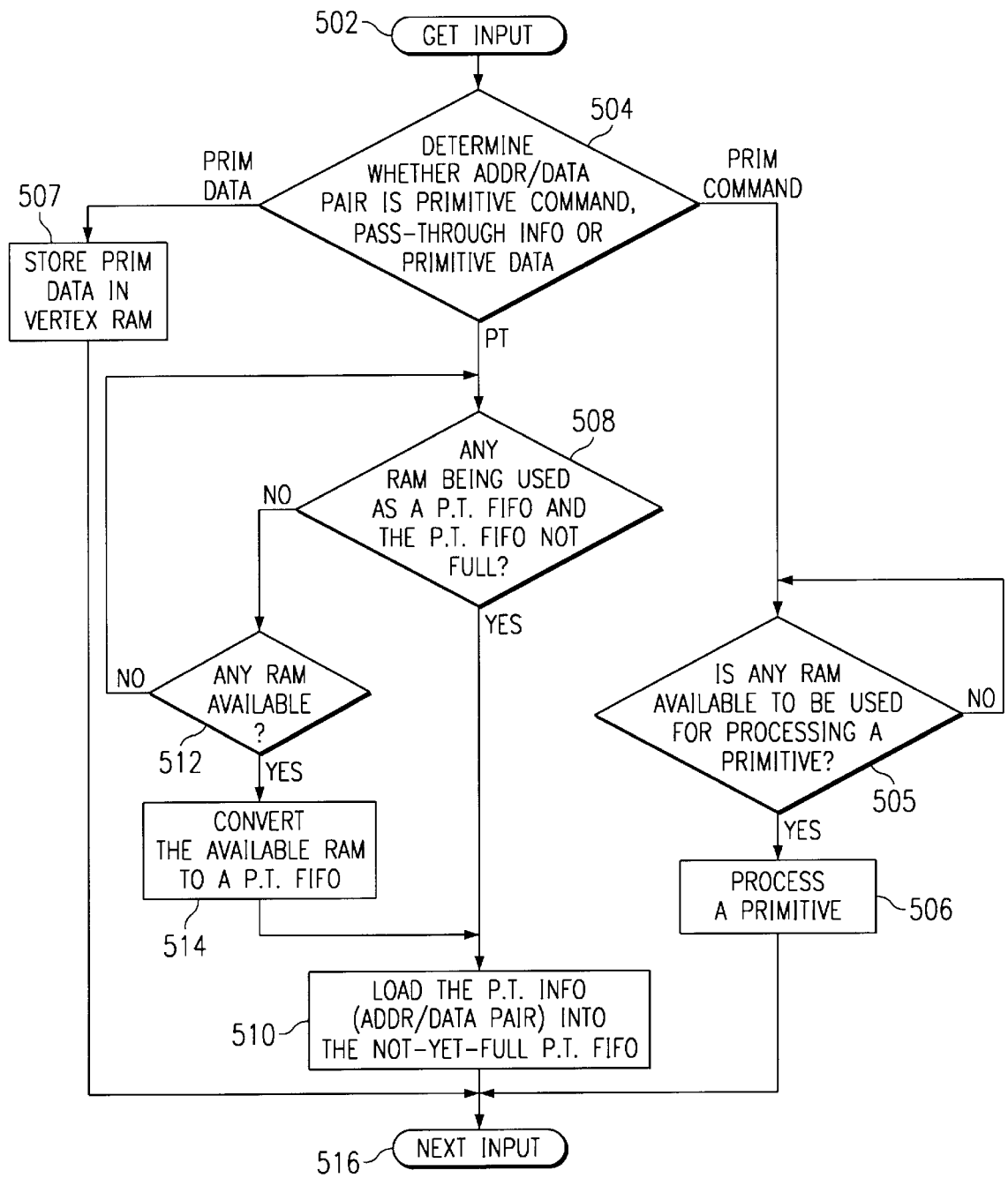
FIG. 5 is a flow diagram illustrating a preferred method of handling input data in a graphics processor according to the invention.

For a better understanding of the operation of graphics processor 400, FIGS. 5 and 6 are provided.

FIG. 5 illustrates a preferred method for handling input information in a graphics processor such as graphics processor 400. First, in step 502, an address/data pair is inspected at the input of the graphics processor. If it is determined in step 504 that the address/data pair is a primitive command that should be processed by the processor, then the processor waits for an available RAM buffer in step 505 and processes a primitive in step 506 responsive to the command. The process is then repeated, as indicated at 516. If it is determined in step 504 that the address/data pair constitutes pass-through information, then step 508 is performed to determine whether either of the two RAMs in the processor is currently being used as a PT FIFO and is not full of PTs. If so, then the new PT is added to the existing but not yet full PT FIFO in step 510, and the process repeats as indicated at 516. If not, then step 512 is performed to determine whether a RAM is available to be turned into a PT FIFO. If not, the process loops back to repeat step 508. If so, then the available RAM is turned into a PT FIFO in step 514 and the process continues at step 510. If in step 504 it is determined that the input is primitive data rather than a command or a pass-through, then the data is stored in a vertex RAM in step 507 and the process is repeated at step 516.

FIG. 6 illustrates a preferred method for handling output information in a graphics processor such as graphics processor 400. In steps 602 and 604, it its determined whether either primitive information can be processed and output from the graphics processor or PT information can be output from the processor. In step 602, if Use Buffer 0 and Use Buffer 1 are both unasserted, then neither PT information nor primitive information is available for output processing, and the loop returns to step 602. If either of them is asserted, on the other hand, then the process continues to step 604. In step 604, Prim in Queue is checked to see whether the information available for output processing is primitive information (Prim in Queue asserted) or PT information (Prim in Queue not asserted). If it is the former, then the primitive data is processed and the results are sent to output FIFO 452 in steps 606 and 608, and processing continues at step 602 again. If it is the latter, then a PT is read from the appropriate RAM in step 610 and sent to output FIFO 452 in step 612, and processing continues at step 602 again.

For an even better understanding of the operation of graphics processor 400, Tables 4 and 5 are provided to walk through two typical example cases.

TABLE 4

| Row | Input being processed | Buffers idle | Who owns write path to buffers | What data is being written to which buffer | enable generated by | Write enable gated to | Read enable gated to | Read enable generated by | Who owns read path to buffers | Output comes from | Output |
|---|---|---|---|---|---|---|---|---|---|---|---|
| 1 | | RAM 0 and RAM 1 | | | | | | | | | |
| 2 | Prim. 1 draw command | RAM 1 | PU 0 | Prim. 1 data to RAM 0 | PU 0 controller | RAM 0 | | | | | |
| 3 | | RAM 1 | PU 0 | Prim. 1 data to RAM 0 | PU 0 controller | RAM 0 | | | | | |
| 4 | | RAM 1 | PU 0 | Prim. 1 data to RAM 0 | PU 0 controller | RAM 0 | | | | | |
| 5 | | RAM 1 | | | | | RAM 0 | PU 1 controller | PU 1 | PU 1 | Prim. 1 data |
| 6 | PT 1 | none | PT FIFO controller | PT 1 to RAM 1 | PT load generator | RAM 1 | RAM 0 | PU 1 controller | PU 1 | PU 1 | Prim. 1 data |
| 7 | PT 2 | none | PT FIFO controller | PT 2 to RAM 1 | PT load generator | RAM 1 | RAM 0 | PU 1 controller | PU 1 | PU 1 | Prim. 1 data |
| 8 | PT 3 | RAM 0 | PT FIFO controller | PT 3 to RAM 1 | PT load generator | RAM 1 | RAM 1 | PT read generator | PT FIFO controller | RAM 1 | PT 1 |
| 9 | PT 4 | RAM 0 | PT FIFO controller | PT 4 to RAM 1 | PT load generator | RAM 1 | RAM 1 | PT read generator | PT FIFO controller | RAM 1 | PT 2 |
| 10 | Prim. 2 draw command | none | PU 0 | Prim. 2 data to RAM 0 | PU 0 controller | RAM 0 | RAM 1 | PT read generator | PT FIFO controller | RAM 1 | PT 3 |
| 11 | | none | PU 0 | Prim. 2 data to RAM 0 | PU 0 controller | RAM 0 | RAM 1 | PT read generator | PT FIFO controller | RAM 1 | PT 4 |
| 12 | | RAM 1 | PU 0 | Prim. 2 data to RAM 0 | PU 0 controller | RAM 0 | | | | | |
| 13 | | RAM 1 | | | | | RAM 0 | PU 1 controller | PU 1 | PU 1 | Prim. 2 data |
| 14 | | RAM 1 | | | | | RAM 0 | PU 1 controller | PU 1 | PU 1 | Prim. 2 data |
| 15 | | RAM 1 | | | | | RAM 0 | PU 1 controller | PU 1 | PU 1 | Prim. 2 data |
| 16 | | RAM 0 and RAM 1 | | | | | | | | | |

Referring now to Table 4, assume that graphics processor 400 is in non-positional lighting mode. At row 1, no PTs or commands are present at the output of input FIFO 438. RAM 0 and RAM 1 are both available, and both processing units are idle. At row 2, a command is detected at the output of input FIFO 438. The command is for graphics processor 400 to draw primitive 1 (Prim 1). Thus, processing unit 0 (P.U. 0) begins processing the primitive and loading intermediate results into RAM 0. Processing unit 0 "owns" the write path to RAM 0 and RAM 1 because the write enable is being generated by left controller 403 (and the mux select for mux 471 is controlled to select the write address produced by left controller 403). The write enable is being gated to RAM 0. This continues until row 5. In row 5, processing unit 0 has finished generating intermediate results for Prim 1. At that time, processing unit 2 begins completing the calculations for Prim 1 because Prim in Queue has been asserted and Use Buffer 0 is asserted. Thus, right controller 405 owns the read path to both RAM 0 and RAM 1; it generates the read enable signal, which is gated to RAM 0. Final results for Prim 1 are produced by processing unit 1 and sent to output FIFO 452. This continues until row 8.

Meanwhile, in row 6, left controller 403 detects a PT at the output of input FIFO 438 and asserts Left Has PT. Because the output path of graphics processor 400 is being occupied by processing unit 1, the PT cannot be sent directly to output FIFO 452 (also, to do so would place the PT out of order vis-a-vis the final results for Prim 1). RAM 1 is available, though, as would be indicated by the Buffer 1 Free signal in response to Left Has PT. As a result, PT Load Generator 455 is enabled and the PT FIFO Controller 451 becomes active. PT 1 is loaded into RAM 1 at PT Write Pointer (and PT Write RAM Select causes PT Load Enable Gating device 459 to route the PT Load Enable signal to RAM 1) and PTs in RAM 1 is asserted. Thus, RAM 1 has been turned into a PT FIFO and will remain so as long as PTs in RAM 1 stays asserted.

In rows 7–9, more PTs present themselves, and they are loaded into the newly created FIFO in RAM 1 behind PT 1 (see FIG. 6). PT FIFO Controller 451 adjusts PT Write Pointer appropriately, in response to the PT Write Sensing input.

Note that, in row 8, processing unit 1 has finished generating final results for Prim l; thus, the graphics processor output path becomes available. According to the process of FIG. 7, the PTs in RAM 1 start to be placed in output FIFO 452, in the order that they were received. (Master controller 401 asserts Use Buffer 1 but not Prim in Queue, and thus enables PT Read Generator 453.) Now PT FIFO Controller 451 owns the output path of graphics processor 400 as well as the input path, and RAM 1 is being written and read at the same time, proving a conduit for PTs 1, 2, 3 and 4.

In row 10, a command to draw another primitive is detected. RAM 0 is available, so processing unit 0 begins generating intermediate results for Prim 2 and placing them in RAM 0. When processing unit 0 is finished with intermediate results for Prim 2, processing unit 1 begins generating final results for Prim 2 and places them in output FIFO 452 behind PT 4.

TABLE 5

| Row | Input being processed | Buffers idle | Who owns write path to buffers | What data is being written to which buffer | Write enable generated by | Write enable gated to | Read enable gated to | Read enable generated by | Who owns read path to buffers | Output comes from | Output |
|---|---|---|---|---|---|---|---|---|---|---|---|
| 1 | | RAM 0 and RAM 1 | | | | | Assume downstream hardware not ready to receive accelerator output here, and accelerator output FIFO full. | | | | |
| 2 | PT 1 | RAM 1 | PT FIFO controller | PT 1 to RAM 0 | PT load generator | RAM 0 | | | | | |
| 3 | PT 2 | RAM 1 | PT FIFO controller | PT 2 to RAM 0 | PT load generator | RAM 0 | | | | | |
| 4 | PT 3 | RAM 1 | PT FIFO controller | PT 3 to RAM 0 | PT load generator | RAM 0 | | | | | |
| 5 | PT 4 | RAM 1 | PT FIFO controller | PT 4 to RAM 0 | PT load generator | RAM 0 | | | | | |
| 6 | PT 5 | RAM 1 | PT FIFO controller | PT 5 to RAM 0 | PT load generator | RAM 0 | | | | | |
| 7 | PT 6 | RAM 1 | PT FIFO controller | PT 6 to RAM 0 | PT load generator | RAM 0 | | | | | |
| 8 | PT 7 | RAM 1 | PT FIFO controller | PT 7 to RAM 0 | PT load generator | RAM 0 | | | | | |
| 9 | PT 8 | RAM 1 | PT FIFO controller | PT 8 to RAM 0 | PT load generator | RAM 0 | | | | | |
| 10 | PT 9 | none | PT FIFO controller | PT 9 to RAM 1 | PT load generator | RAM 1 | | | | | |
| 11 | PT 10 | none | PT FIFO controller | PT 10 to RAM 1 | PT load generator | RAM 1 | | | | | |
| 12 | Prim. 1 draw command | none | | | | | RAM 0 | PT read generator | PT FIFO controller | RAM 0 | PT 1 |
| 13 | | none | | | | | RAM 0 | PT read generator | PT FIFO controller | RAM 0 | PT 2 |
| 14 | | none | | | | | RAM 0 | PT read generator | PT FIFO controller | RAM 0 | PT 3 |
| 15 | | none | | | | | RAM 0 | PT read generator | PT FIFO controller | RAM 0 | PT 4 |
| 16 | | none | | | | | RAM 0 | PT read generator | PT FIFO controller | RAM 0 | PT 5 |
| 17 | | none | | | | | RAM 0 | PT read generator | PT FIFO controller | RAM 0 | PT 6 |
| 18 | | none | | | | | RAM 0 | PT read generator | PT FIFO controller | RAM 0 | PT 7 |
| 19 | | none | | | | | RAM 0 | PT read generator | PT FIFO controller | RAM 0 | PT 8 |
| 20 | | none | PU 0 | Prim. 1 data to RAM 0 | PU 0 controller | RAM 0 | RAM 1 | PT read generator | PT FIFO controller | RAM 1 | PT 9 |
| 21 | | none | PU 0 | Prim. 1 data to RAM 0 | PU 0 controller | RAM 0 | RAM 1 | PT read generator | PT FIFO controller | RAM 1 | PT 10 |
| 22 | | RAM 1 | PU 0 | Prim. 1 data to RAM 0 | PU 0 controller | RAM 0 | | | | | |
| 23 | | RAM 1 | | | | | RAM 0 | PU 1 controller | PU 1 | PU 1 | Prim. 1 data |
| 24 | | RAM 1 | | | | | RAM 0 | PU 1 controller | PU 1 | PU 1 | Prim. 1 data |
| 25 | | RAM 1 | | | | | RAM 0 | PU 1 controller | PU 1 | PU 1 | Prim. 1 data |
| 26 | | RAM 0 and RAM 1 | | | | | | | | | |

Table 5 is provided to show that, if necessary, graphics processor 400 can cause both RAM 0 and RAM 1 to function as PT FIFO buffers at the same time. In a preferred embodiment, PT Write Pointer and PT Read Pointer are only 3 bits wide; thus, eight PTs can be stored in each RAM. Because, in a preferred embodiment, the actual size both RAMs 0 and 1 is much larger (64 addresses), different implementations might use a larger PT Read and Write Pointer, thus enabling even more PTs to be buffered.

Referring now to Table 5, assume that hardware downstream of graphics processor 400 is busy and is not able to accept input. Assume further that output FIFO 452 is full. In row 2, PTs start to appear at the output of input FIFO 438. PT FIFO controller 451 takes control of the write path and turns RAM 0 into a PT FIFO. It loads subsequent PTs into the PT FIFO in RAM 0 until, at row 9, that FIFO is full of PTs. (PTs in RAM 0 and RAM 0 Full of PTs are both asserted at this point). But more PTs present themselves. Therefore, according to the process of FIG. 6, since another RAM is available, PT FIFO Controller 451 converts that into a PT FIFO also. So, in rows 10 and 11, PTs 9 and 10, are loaded into RAM 1. To accomplish this, PT FIFO Controller 451 keeps track of both the write pointer for RAM 0 and the write pointer for RAM 1, presenting the proper write pointer at the PT Write Pointer in conjunction with the proper PT Write RAM Select assertion level. (PT FIFO Controller 451 performs a similar function in the case of read pointers for RAM 0 and RAM 1.)

Finally, at row 12, assume that downstream hardware is ready to accept input. Assume farther than, at the same time, a draw Prim command is detected at the output of input FIFO 438. Because output FIFO 452 is clearing the output FIFO full signal (not shown) is unasserted and, according to the process of FIG. 6, PTs can be loaded into output FIFO 452. Thus, at row 12, PT FIFO Controller 451 assumes control of the output path and begins reading PTs from the RAM 0 PT FIFO. The command to draw Prim 1 cannot yet be processed because no RAMs are available in which to store intermediate results for Prim 1.

Once all of the PTs from RAM 0 are unloaded (at row 20), PTs in RAM 0 is unasserted, and master controller 401 indicates to left controller 403 (by asserting Buffer 0 Free) that it may begin processing Prim 1. So, at row 20, left controller 403 assumes control of the write path, and processing unit 0 begins generating intermediate results for Prim 1 and loading them into RAM 0. But even when processing unit 0 finishes with Prim 1 and its results are ready in RAM 0, Prim in Queue will not be asserted for processing unit 2 until all of the PTs have been placed in output FIFO 452. In this example, that special case is not reached because PT 10 is placed in output FIFO 452 before processing unit 0 finishes with Prim 1.

Beginning at row 23, processing unit 1 reads the intermediate results from RAM 0, calculates the final results for Prim 1, and places them in output FIFO 452.

While the present invention has been described in detail in relation to various preferred embodiments thereof, the described embodiments have been presented by way of example only, and not by way of limitation. It will be understood by those skilled in the art that various changes may be made in the form and details of the described embodiments, resulting in equivalent embodiments that remain within the scope of the appended claims.

What is claimed is:

1. A graphics accelerator architecture for processing pre-rasterized primitive data responsive to primitive commands and for relaying pass-through information, comprising:

an input port for receiving pass-through information, pre-rasterized primitive data and primitive commands;

an output port for outputting pass-through information and processed primitive data;

first and second graphics processing units, each operable to process aspects of pre-rasterized graphics primitives, said first graphics processing unit having a first data input and a first data output, and said second graphics processing unit having a second data input and a second data output;

an input path multiplexer;

an output path multiplexer;

first and second dual-ported random access memories, each having a write port and a read port; and control circuitry; wherein:

said input port is coupled both to said first data input and to a first input of said input path multiplexer, said first data output is coupled to a second input of said input path multiplexer, the output of said input path multiplexer is coupled to said write ports of both of said first and second dual-ported random access memories, and the control input of said input path multiplexer is coupled to said control circuitry; and said read ports of both of said first and second dual-ported random access memories are coupled to a first input of said output path multiplexer and to said second data input, said second data output is coupled to a second input of said output path multiplexer, the output of said output path multiplexer is coupled to said output port, and the control input of said output path multiplexer is coupled to said control circuitry.

2. A graphics accelerator architecture according to claim 1, wherein:

said control circuitry and said input multiplexer are operable, when pass-through information is present at said input port and at least one of said random access memories is available to store it, to couple said write ports of said first and second random access memories to said input port to enable pass-through information to be written from said input port into at least one of said first and second random access memories; and wherein said control circuitry and said input multiplexer are operable, when a primitive command is present at said input port and at least one of said first and second random access memories is available to be used during the execution of the primitive command, to couple said write ports of said first and second random access memories to said first data output to enable processed primitive data to be written from said first graphics processing unit into at least one of said first and second random access memories.

3. A graphics accelerator architecture according to claim 1, wherein:

said control circuitry and said output multiplexer are operable, when it is time to present stored pass-through information at said output port, to couple said output port to said read ports of said first and second random access memories to enable the stored pass-through information to be communicated from at least one of said first and second random access memories to said output port; and wherein said control circuitry and said output multiplexer are operable, when it is time to present processed primitive data at said output port, to couple said output port to said second data output to enable the processed primitive data to be communicated from said second data output to said output port.

4. A graphics accelerator architecture according to claim 1, wherein said control circuitry further comprises:

a FIFO write address generator, a RAM write address generator, a write address multiplexer having its first input coupled to said FIFO write address generator, its second input coupled to said RAM write address generator, and its output coupled to the write address inputs of both of said first and second dual-ported random access memories;

a FIFO read address generator;

a RAM read address generator;

a read address multiplexer having its first input coupled to said FIFO read address generator, its second input coupled to said RAM read address generator, and its output coupled to the read address inputs of both of said first and second dual-ported random access memories; and circuitry for independently controlling the read enable input of said first dual-ported random access memory, the write enable input of said first dual-ported random access memory, the read enable input of said second dual-ported random access memory, and the write enable input of said second dual-ported random access memory; wherein said control circuitry is operable to cause said first dual-ported random access memory to act as a FIFO when it stores pass-through information, but to act as a RAM when it stores processed primitive data; and wherein said control circuitry is operable to cause said second dual-ported random access memory to act as a FIFO when it stores pass-through information, but to act as a RAM when it stores processed primitive data.

5. A method of using a computer graphics accelerator having an input and an output to process pre-rasterized primitive data responsive to primitive commands and to relay pass-through information, said method comprising the steps of:

a) storing first vertex data received at the input in a vertex RAM;

b) responsive to receiving a first primitive command at the input, processing said first vertex data using a first graphics processor disposed within the computer graphics accelerator;

c) storing first intermediate results from step b) in a first RAM disposed within the computer graphics accelerator;

d) accessing said first intermediate results from said first RAM using a second graphics processor disposed within said graphics accelerator to further process said first intermediate results into first final results;

e) presenting said first final results at the output of said graphics accelerator; during steps d) and e), executing steps f), g) and h) as follows:

f) storing second vertex data received at the input in said vertex RAM;

g) responsive to receiving a second primitive command at the input, processing said second vertex data using said first graphics processor disposed within the computer graphics accelerator;

h) storing second intermediate results from step g) in a second RAM disposed within the computer graphics accelerator; after executing step d), executing steps i) and j) as follows:

i) accessing said second intermediate results from said second RAM using said second graphics processor disposed within said graphics accelerator to further process said second intermediate results into second final results;

j) presenting said second final results at the output of said graphics accelerator; and during steps i) and j), executing steps k) and l) as follows:

k) responsive to receiving pass-through information at the input, causing said first RAM to begin behaving as a FIFO;

l) storing said pass-through information in said FIFO; finally, after step j) is completed, m) retrieving said pass-through information from said FIFO; and n) presenting said pass-through information at the output of said graphics accelerator.

* * * * *

UNITED STATES PATENT AND TRADEMARK OFFICE
CERTIFICATE OF CORRECTION

PATENT NO.   : 6,003,098
DATED        : December 14, 1999
INVENTOR(S)  : Alan Krech Jr.

It is certified that error appears in the above-identified patent and that said Letters Patent is hereby corrected as shown below:

Columns 9 and 10,
Table 3, in the line immediately below the heading "Positional Lights Mode" delete "acst" and insert therefor -- acts --

Columns 17 and 18,
Under heading "Table 4", in the 6th column heading of the table, delete "enable generated by" and insert therefor -- Write enable generated by --

Signed and Sealed this

Thirtieth Day of July, 2002

Attest:

JAMES E. ROGAN
Attesting Officer    Director of the United States Patent and Trademark Office